June 25, 1963  P. J. LEBLANC  3,094,830
COMBINATION RAKE-MOWER

Filed June 6, 1961  3 Sheets-Sheet 1

Prosper J. Le Blanc
INVENTOR.

BY Clarence A. O'Brien
and Harvey B. Jacobson
Attorneys

June 25, 1963  P. J. LEBLANC  3,094,830
COMBINATION RAKE-MOWER
Filed June 6, 1961  3 Sheets-Sheet 2

Prosper J. LeBlanc
INVENTOR.

BY Clarence A. O'Brien
and Harvey B. Jacobson
Attorneys

June 25, 1963 P. J. LEBLANC 3,094,830
COMBINATION RAKE-MOWER
Filed June 6, 1961 3 Sheets-Sheet 3

Prosper J. Le Blanc
INVENTOR.

BY Clarence A. O'Brien
and Harvey B. Jacobson
Attorneys

United States Patent Office 3,094,830
Patented June 25, 1963

3,094,830
COMBINATION RAKE-MOWER
Prosper J. Leblanc, 239 E. Hatfield St., Massena, N.Y.
Filed June 6, 1961, Ser. No. 115,197
3 Claims. (Cl. 56—24)

This invention comprises a novel and useful combination rake-mower and more particularly pertains to a mobile, power operated machine adapted to perform a variety of useful occupations such as raking or mowing a lawn, gathering leaves and grass and sacking the same, sweeping sidewalks and removing snow.

The houseowner, particularly one having a considerable expanse of lawn, walk or drive to take care of, would frequently benefit from the services of power machinery to assist him in the various servicing occupations required. However, the cost of the necessary power operated equipment to perform such varied purposes and functions as cutting a lawn, raking and collecting the cut grass or leaves therefrom, sweeping sidewalks or roadways, removing snow from driveways and walks and the like imposes an excessive financial burden. The financial outlay will be considerably lessened and the householder correspondingly benefited by the provision of a machine which could perform these varied functions from a single power-equipped chassis.

It is therefore the primary purpose of this invention to provide an apparatus in accordance with the preceding desired conditions and to perform the above-mentioned operations.

A further object of the invention is to provide an improved power operated apparatus which may be readily converted from one intended use to function most efficiently for another intended use thereof.

Yet another object of the invention is to provide a device in accordance with the foregoing object wherein rotary rake means and a rotary brush may be interchangeably located and mounted within a confining chamber in a manner to prevent the undesirable throwing of grass, leaves or other matter by the power operated element of the machine.

A further object of the invention is to provide an apparatus in accordance with the foregoing object which shall include a power operated suction fan for picking up leaves, grass or the like from within the above-mentioned chamber containing the rake or brush, and discharging the same into a collection hopper from which they may be readily discharged from time to time.

Still another purpose of the invention is to provide an apparatus in accordance with the preceding objects wherein the source of power is mounted upon the top of the machine in a readily accessible manner and is protected against contact with or injury from the material being raked or brushed by the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and which:

Figure 3:
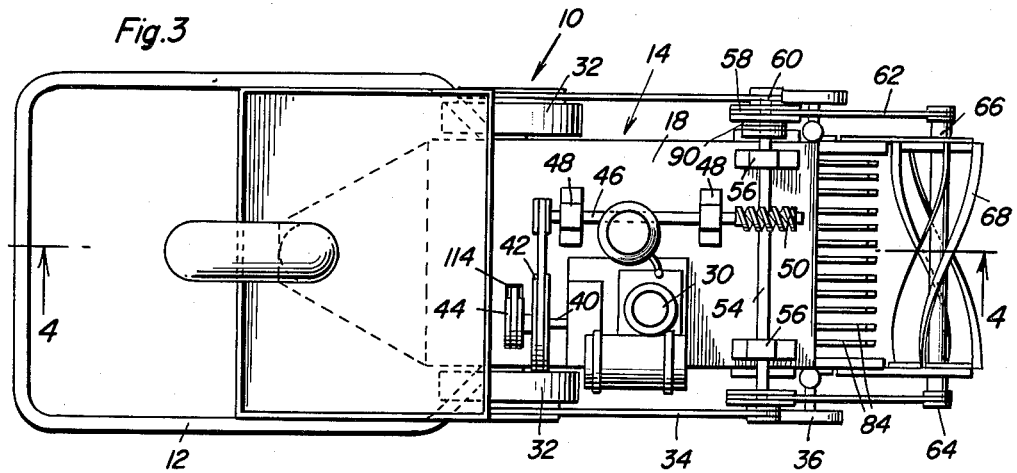
FIGURE 3 is a top plan view of the form of apparatus shown in FIGURE 1, certain concealed parts being shown in dotted lines therein.

In the accompanying drawings which illustrate a preferred embodiment of apparatus in accordance with the principles of this invention, the numeral 10 designates generally a portable, hand maneuverable power operated apparatus. This apparatus, as shown in FIGURE 3, preferably includes a handle assembly 12 by means of which the apparatus can be readily steered and maneuvered.

Figure 6:
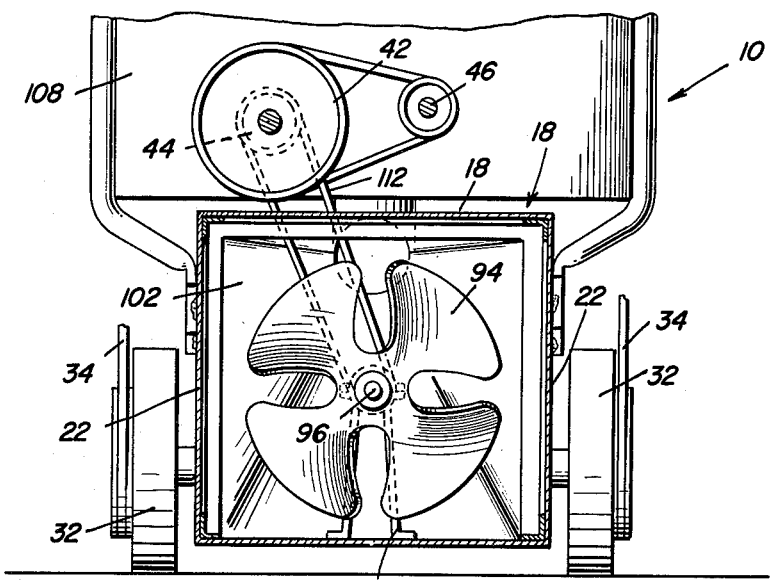
FIGURE 6 is a vertical transverse sectional detail view taken upon an enlarged scale substantially upon the plane indicated by the broken section lines 6—6 of FIGURE 4 and showing in particular the suction fan of the grass and leaf collecting and removing means of the apparatus.

The apparatus further includes a mobile frame indicated generally by the numeral 16 and which frame includes a top wall 18, a rear wall 20 together with a pair of depending side walls each indicated by the numeral 22 in FIGURE 6. The walls 18, 20 and 22 are interconnected together rigidly in any suitable manner so as to provide a chamber having an open bottom closely adjacent to the ground over which the machine moves and an open front. The handles 12 are secured to these side walls while mounted exteriorly of the chamber and upon the top of the frame upon the top wall 18 thereof is an internal combustion engine 30 which comprises the power plant of the apparatus. Since the internal combustion engine is of any conventional and known design, a description of the structure and of the various necessary accessories and equipment of the engine has been omitted as being unnecessary to an understanding of the invention set forth and claimed herein.

The engine comprises the source of power for operating all of the equipment of this apparatus and also for effecting propulsion of the same. For this latter purpose, the apparatus includes a plurality of supporting and driving wheels 32 suitably journaled upon the frame 10, as upon the side walls 22 thereof, and which supporting and driving wheels are connected to the engine as by means of a belt and pulley drive indicated by the numeral 34. Obviously, gearing, a chain drive or the like may be employed as an equivalent driving means, the present invention being not limited to any particular driving means.

The frame also includes other supporting wheels such as that indicated at 36 and which is adapted to be vertically adjusted as by a vertical adjustment assembly indicated generally by the numeral 38, the details of which form no part of the invention claimed hereinafter. The vertical adjustment means is provided so that the front and bottom edge of the frame of the device may be vertically adjusted with respect to the ground for a purpose which will be readily understood.

Figure 1:
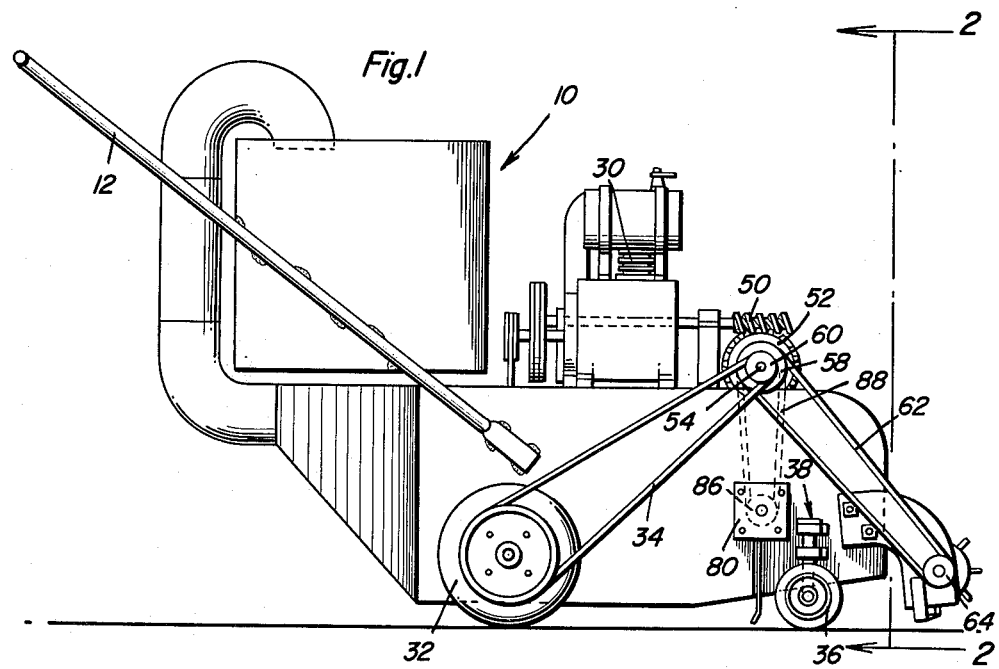
FIGURE 1 is a side elevational view of a preferred form of the apparatus incorporating therein the principles of this invention and illustrating the same with the necessary equipment for mowing a lawn and collecting the grass and leaves therefrom by means of a rotary rake member.
Figure 2:
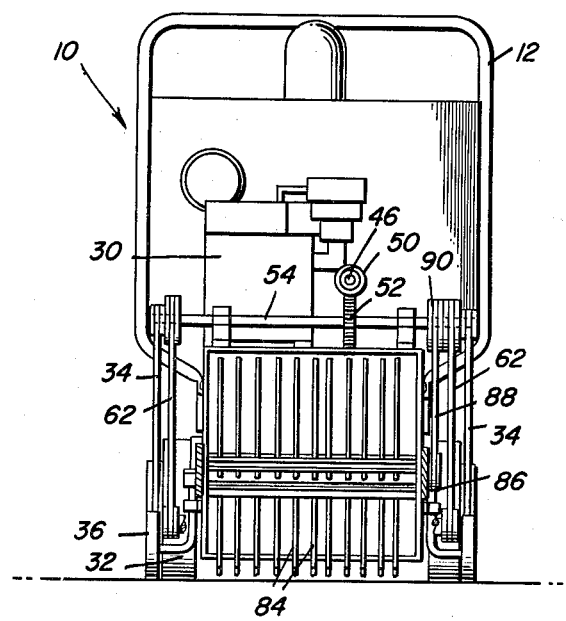
FIGURE 2 is a front elevational view of the arrangement of FIGURE 1.
Figure 4:
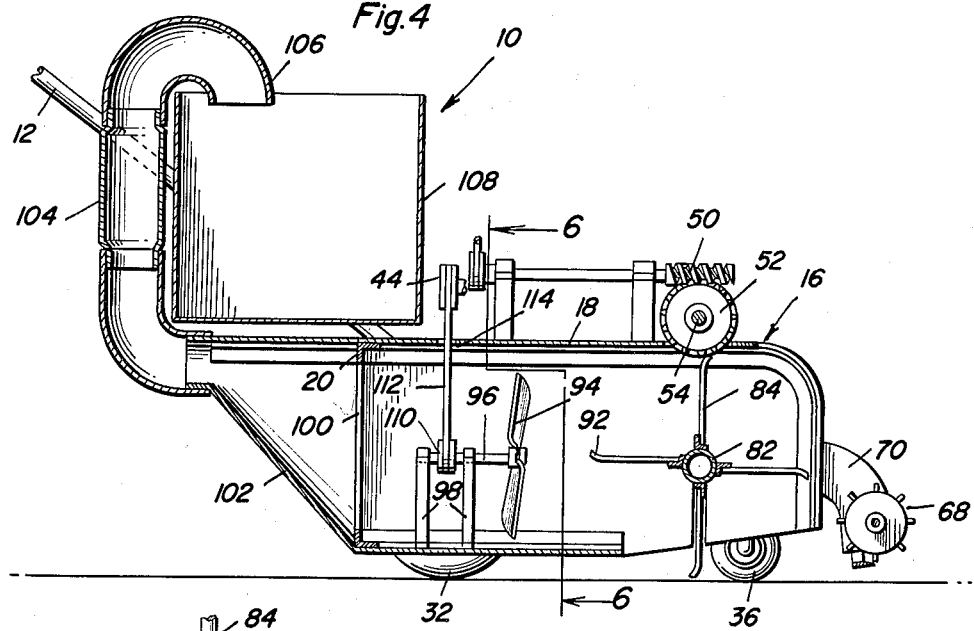
FIGURE 4 is a vertical central longitudinal view through the apparatus of FIGURE 3, being taken substantially upon the plane indicated by the section line 4—4 of FIGURE 3.

Referring now to FIGURE 3 in conjunction with FIGURES 1 and 4 it will be observed that the engine 30 has a drive shaft which constitutes a power output means and which has been indicated by the numeral 40 therein. This output shaft is provided with a pair of driving pulleys 42 and 44. Belts connecting these pulleys serve to transmit power therefrom to other instrumentalities as will be now set forth.

The pulley 42 is coupled to a lay shaft 46 mounted in suitable journal bearings 48 upon the top wall 18, which lay shaft is provided with a worm gear as at 50 which meshes with a gear 52 carried by the jack shaft 54. The latter shaft is journaled upon the top wall 18 of the frame by suitable bearing blocks 56 and at its opposite ends overhangs the side of the frame with each end being provided with a set of pulleys 58 and 60.

The pulleys 60 are connected by the belts 34 to the driving and support wheels 32 and thus there is provided a reduction gear drive forming a part of the propulsion means for the apparatus.

Figure 9:
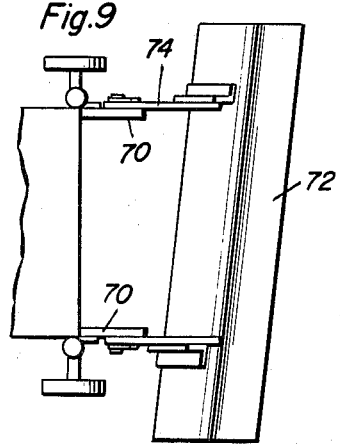
FIGURE 9 is a fragmentary top plan view showing the manner in which a snow plow blade is removably supported upon the apparatus in place of the mower element.
Figure 10:
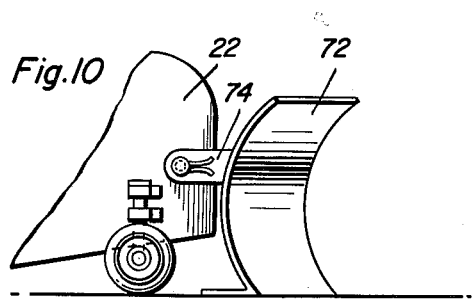
FIGURE 10 is a fragmentary side elevational view of the arrangement of FIGURE 9.

The pulleys 58, through suitable belt connections 62, are connected to corresponding driven pulleys 64 carried by the outwardly projecting extremities of the shaft 66 of a conventional reel type of mower 68. This mower is rotatably journaled in suitable bearings carried by the forwardly extending brackets 70 secured to the side walls 22 and comprising journal and support means for the mower. These brackets also serve as support means, as shown in FIGURES 9 and 10, for interchangeably supporting thereon a snowplow blade 72, the latter having rearwardly projecting support brackets 74 which are releasably secured in any suitable manner to the support brackets 70. Thus, for winter use, the mower 68 may be readily removed and replaced by the snowplow blade whereby the device will serve as a portable power operated snowplow to assist in clearing driveways and the like.

Figure 5:
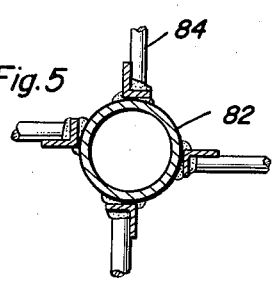
FIGURE 5 is a horizontal sectional detail view showing structural details of the rotary rake, constituting an enlargement of a portion of the rake element of FIGURE 4.

Referring again to the use of the device as a mower, it will be noted that there are also provided within the chamber defined by the previously mentioned top, rear and side walls, journal means or journal blocks 80 in which is rotatably journaled a shaft or axle 82 extending transversely within the chamber. As shown best in FIGURES 4 and 5, the shaft 82 has a plurality of radially extending rake teeth 84 thereon with a set of teeth being disposed in a radially extending plane and with a plurality of longitudinally spaced sets of teeth being provided along the length of the shaft. The projecting extremities of the shaft 82 are likewise provided with driven pulleys 86, see FIGURE 1, which are drivingly connected as by a belt 88 to a further pulley 90 appearing upon the jack shaft 54. As suggested in FIGURE 3, only one such drive means need be provided for the shaft 82, at one side of the machine, although duplicate drive means on opposite sides of the machine may be employed if deemed advisable. It will thus be seen that the reduction gear drive of the motor likewise supplies power to the rotary rake.

As so far described, it will now be apparent that operation of the device as it moves forward will enable the power driven mower to cut the grass, and the rotary rake will lift and throw this grass rearwardly within the chamber, owing to the angulated end portions 92 at the outer ends of the rake teeth as shown in FIGURE 4. This upwardly lifted grass or other material will be discharged and removed from the chamber through a combined collecting and discharge means. This latter includes the suction fan 94 carried by a shaft 96 which is journaled upon suitable support brackets 98 appropriately mounted upon and carried by the frame 14 of the apparatus and within the chamber thereof. The rear wall 20 of the chamber is provided with an opening 100 and a duct or housing structure 102 is attached to this rear wall, surrounds this opening and collects and discharges the material thrown thereinto by the suction fan and delivers this material by a suitable conduit system 104 having a discharge end 106. Conveniently, this discharge end may deliver its contents into the open upper end of a hopper 108 suitably positioned upon the frame of the apparatus as upon the top wall thereof.

When it is desired to use the apparatus as a means for mowing the lawn and collecting grass and leaves therefrom, the arrangement shown in FIGURES 1-4 and 6 is employed. The device propelled forward by the engine, and the mower, the rotary rake and the blower are likewise propelled by the engine. It will be observed that the blower fan is connected to the engine directly through the reduction gearing assembly. For this purpose, the shaft 96 has a pulley 110 thereon which is connected by a belt 112 extending through a suitable opening 114 in the top wall 18, for connecting the previously mentioned pulley 44. Thus, the blower operates at high speed while the apparatus travels forward and the mower and rake operate at relatively slow speeds.

Figure 7:
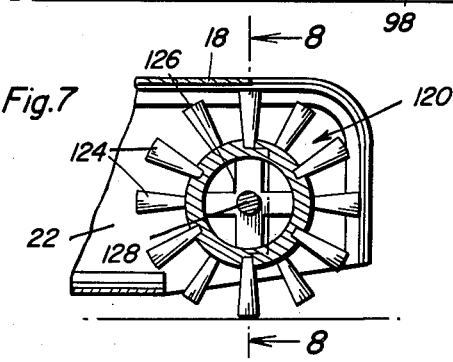
FIGURE 7 is a fragmentary view similar to FIGURE 4 but showing the alternative installation of a rotary brush in place of the rotary rake of the apparatus.
Figure 8:
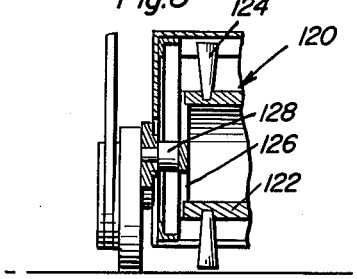
FIGURE 8 is a vertical transverse sectional view taken substtantially upon the plane indicated by the section line 8—8 of FIGURE 7.

When it is desired to utilize the device as a brush for cleaning driveways and the like, the device may be used either with or without the mower 68, and with the rotary rake being replaced by the rotary brush indicated generally by the numeral 120 and whose construction is shown in FIGURES 7 and 8.

Referring particularly to FIGURES 7 and 8 it will be observed that the rotary brush consists of a cylinder or drum 122 having upon the exterior surface thereof a plurality of bristles or brushes 124. The latter are arranged in longitudinally or transversely spaced sets with each set consisting of a plurality of radially extending brushes or bristles. The opposite ends of the drum 122 have a spider assembly 126 therein by means of which stub axles 128 are disposed axially of the drum and project exteriorly thereof. These axles are provided with suitable pulleys by which they may be connected to and driven by the previously mentioned belt 88 by which the rotary rake was power operated. Thus, when the rotary rake is removed from its journal means, it may be replaced within the chamber by the rotary brush and connected to the same driving means.

In some instances, it may be preferred to permit the collecting and discharge means consisting of the power operated suction fan with the discharge duct and hopper to remain upon the apparatus when the rotary brush is being utilized. However, any of these elements can be readily removed when it is desired to limit the apparatus to a power driven implement for a single purpose.

When the snowplow is employed, the mower will of course necessarily be removed from the apparatus. However, the snowplow may function satisfactorily even though the rotary rake and/or brush are allowed to remain upon the apparatus and even though the power operated suction fan and the collecting and discharge means still remain in place. In some instances, the function of these other elements may be desirable inasmuch as it may tend to facilitate removal of snow which had passed below the plow blade, particularly if the latter is adjusted for a vertical height to clear the ground where very deep snows are encountered, with the brush or rake and the collecting and discharge means serving to remove from the ground a further portion of the snow thereon which is left by the plow.

The apparatus is easily maneuvered, and the power plant together with its reduction gearing drive is placed for convenient inspection or servicing as well as for protection against material which may be thrown or discharged by the rotating elements or implements of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power operated and hand maneuverable apparatus comprising a support frame having front and rear depending ground engaging support wheels, said frame defining a low generally horizontally disposed passage extending generally longitudinally of said frame, said passage being open at its forward end and including opposite side walls which terminate at their forward ends a spaced distance forwardly of the bottom wall of said passage whereby the latter also opens downwardly at its forward end, an elongated rotary pick-up assembly journaled for rotation about its longitudinal axis, extending transversely across the downwardly opening portion of the forward end of said passage and projecting slightly outwardly of and below said passage, an axial flow blower journaled for rotation about an axis generally coinciding with the longitudinal center line of said passage and disposed rearwardly of the forward end of said bottom wall and said pick-up assembly, said passage, a spaced distance rearwardly of said blower, gradually tapering, rearwardly of said rear depending support wheels, into a reduced cross-sectional area portion, said reduced cross-sectional area portion including an outlet having a receptacle communicated therewith, said receptacle being supported from said frame, a prime mover supported from said frame and drivingly connected to said pick-up assembly in said blower, said reduced cross-sectional area portion of said passage terminating rearwardly in an upwardly directed outlet conduit communicated with said receptacle, said receptacle being supported from said frame above said tapering portion of said passage and said prime mover being disposed above the portion of said passage forwardly of said tapering portion thereof and forwardly of said receptacle, said frame including a reel cutter assembly supported forwardly of said pick-up assembly having a rotatable reel to which said prime mover is drivingly connected, said reel cutter assembly being disposed in generally horizontal alignment with the lower portion of the forward end of said passage whereby the grass cutting discharged rearwardly and upwardly from said reel cutter assembly will be discharged directly into the forward end of said passage.

2. The combination of claim 1 wherein said opposite side walls and said bottom wall, in said tapering portion of said passage are inwardly and upwardly inclined respectively.

3. The combination of claim 1 wherein said forward wheels comprise caster wheel assemblies which are adjustable in elevation relative to said frame.

References Cited in the file of this patent

UNITED STATES PATENTS

| | | |
|---|---|---|
| 1,992,820 | Gedney | Feb. 26, 1935 |
| 2,670,486 | Daniell | Mar. 2, 1954 |
| 2,700,863 | Etem | Feb. 1, 1955 |
| 2,959,904 | Ferris | Nov. 15, 1960 |